TUNABLE ULTRA-HIGH FREQUENCY BAND PASS FILTERS

Filed May 29, 1951 2 Sheets-Sheet 1

INVENTOR
Wen Yuan Pan
BY H. W. Newton
ATTORNEY

Aug. 17, 1954 WEN YUAN PAN 2,686,903

TUNABLE ULTRA-HIGH FREQUENCY BAND PASS FILTERS

Filed May 29, 1951 2 Sheets-Sheet 2

INVENTOR
Wen Yuan Pan
BY H. W. [signature]
ATTORNEY

Patented Aug. 17, 1954

2,686,903

UNITED STATES PATENT OFFICE 2,686,903

TUNABLE ULTRAHIGH-FREQUENCY BAND PASS FILTERS

Wen Yuan Pan, Collingswood, N. J., assignor to Radio Corporation of America, a corporation of Delaware Application May 29, 1951, Serial No. 228,892

11 Claims. (Cl. 333—73)

This invention relates generally to band-pass filters for high frequency signals and the like, and particularly relates to a circuit structure tunable within the ultra high frequency (UHF) television broadcast range to provide a variable pass band effect in a signal circuit operating in that range.

Recently the UHF band from 500 to 890 megacycles (mc.) has been tentatively allocated for broadcasting television images. Tunable circuit structures in accordance with the invention such as band pass filters are particularly adapted for tuning in the receiver to a selected television station broadcasting within this new UHF band. To this end UHF converters or superheterodyne receivers are used. In such a superheterodyne receiver various spurious responses may be encountered.

Thus, a signal at the so-called image frequency will beat with the local oscillator frequency to develop an undesired intermediate frequency signal. If, for example, the frequency of the local oscillator is higher than the desired signal frequency, the intermediate frequency results from subtracting the signal frequency from the oscillator frequency. In that case, the image frequency is above the oscillator frequency by an amount equal to the intermediate frequency so that, when the oscillator frequency is subtracted from the image frequency, an undesired intermediate frequency signal results. Of course, if the oscillator frequency is below the desired signal frequency, the image frequency will also be below the oscillator frequency. In other words, the image frequency has a distance from the signal frequency which equals two times the intermediate frequency. Other spurious responses are obtained, for example, when the second harmonic of the local oscillator wave beats with an undesired signal to develop another undesired intermediate frequency signal.

In order to attenuate such undesirable responses, it is conventional practice to provide suitable filter circuits between the antenna and the mixer of the receiver or between the antenna and the first radio-frequency amplifier stage if such an amplifier stage is provided. Such filter circuits usually provide a pass band having high attenuation outside of the pass band. A filter circuit of this type conventionally consists of two or more coupled tuned circuits. However, if the coupling of the tuned circuits approaches critical coupling, it is difficult to tune or to adjust such a band pass filter in view of the interaction of the resonant circuits. Various trap circuits have also been incorporated in television receivers to provide attenuation of one or more undesirable signals or to reduce radiation from the local oscillator. However, such trap circuits are impractical for UHF receivers or converters which must cover a wide frequency band because they will only attenuate alternating currents within a narrow frequency range.

Usually the image frequency signal provides the most undesirable responses. Accordingly, a well designed band pass filter should provide high attenuation at the image frequency throughout the tuning range of the filter. Preferably, the image frequency should be tracked with the variable frequency of the pass band to provide maximum attenuation of the image frequency signal throughout the tuning range.

It is, accordingly, an object of the present invention to provide a circuit structure suitable, for example, for use in a UHF superheterodyne receiver as a tunable radio-frequency band pass filter which will provide high attenuation at the image frequency.

A further object of the invention is to provide a UHF circuit structure equivalent to a T-formation filter providing a pass band having an adjacent high attenuation frequency region which has a constant frequency difference from the center of the pass band throughout the tuning range.

Another object of the invention is to provide a UHF filter structure of the character described which has low insertion loss, substantially constant load resistance and substantially constant inductance over its tuning range.

A UHF filter structure in accordance with the present invention is equivalent to a T-formation filter circuit consisting of three tunable series resonant circuits. The filter structure comprises three conductive capacitance members spaced and electrically insulated from each other and a conductive tuning element or metallic core assembly which is adapated to move with respect to the three capacitance members. The core assembly comprises two or preferably three core portions which cooperate with the three capacitance members and which are shaped to vary the capacitance between each of the members and its associated core portion upon movement of the core assembly. The three capacitance members may be provided on the outside of a tube consisting of a material having a high dielectric constant such, for example, as glass. The three members may consist of metallic coatings spaced from each other by substantially equal distances.

Alternatively, one coating may extend about the circumference of the tube while the other two coatings are disposed substantially opposite to each other. The core portions are interconnected by metallic rods which represent inductance. Two transmission lines may be connected to the three metallic coatings with one coating serving as the common input and output terminal which may be grounded.

The resulting filter structure may be tuned over a portion of the UHF frequency range to provide a pass band and an adjacent high attenuation region which track throughout the tuning range. The high attenuation region may be used for rejecting image frequency signals. The thus obtained image frequency attenuation is about 30 to 40 db in addition to that which is obtained by the other coupled tuned circuits used in conjunction with this filter. The circuit structure also provides good attenuation at the oscillator frequency thereby to reduce oscillator radiation.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1:
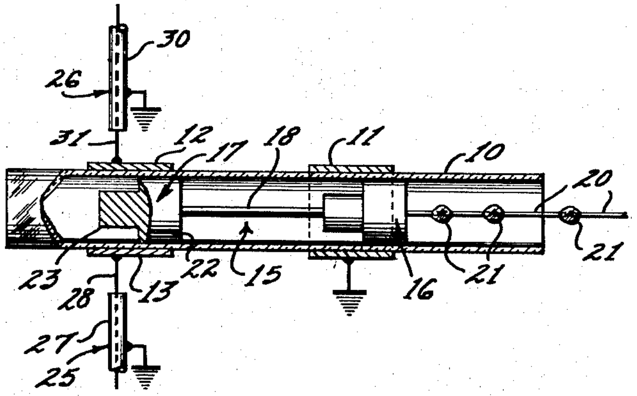
Figure 1 is a schematic view, with portions broken away and partly in cross-section of a circuit structure embodying the present invention.

Referring now to the drawings wherein like elements have been designated by the same reference characters and particularly to Figure 1 there is illustrated a UHF tunable filter structure which includes a hollow tube 10 consisting of a material having a high dielectric constant. Thus tube 10 may, for example, consist of a ceramic material or of glass having a high dielectric constant. The tube 10 is provided with three conductive capacitance members or metallic coatings 11, 12, and 13. The coatings 11, 12 and 13 may consist of a suitable metal such, for example, as copper or silver which are good electrical conductors. The coating 11 preferably extends about the entire circumference of tube 10. Coatings 12 and 13 are also provided on the outside of tube 10 and are disposed substantially opposite to each other. The coatings 12 and 13 have a suitable gap between each other so that they are electrically insulated from each other.

A conductive tuning element or core assembly generally indicated at 15 cooperates with the coatings 11, 12 and 13. In the modification of the invention shown in Figure 1 a core portion 16 is associated with the coating 11, while the second core portion 17 cooperates with both coatings 12 and 13. The two core portions 16, 17 are electrically interconnected by a metallic rod 18. The core assembly 15 may, for example, consist of copper, brass or Kovar and is slideable within the tube 10. The core assembly 15 may be actuated within tube 10 by means of stiff wires 20 which are electrically insulated from each other by suitable insulating material indicated at 21. The purpose of the insulating material 21 is to insulate the wires 20 from the chassis and to prevent the wires 20 from resonating within the tuning range of the filter structure.

Individual capacitances are formed between core portion 16 and coating 11, and between core portion 17 and each coating 12 and 13. The core portions 16 and 17 may be shaped to vary these three capacitances upon movement of the core assembly 15. Thus, as illustrated each core portion 16 and 17 may consist of a wide cylinder 22 and a smaller cylinder 23. However, it is to be understood that each core portion may have a different suitable shape and may, for example, be tapered. The actual shape of each core portion 16 or 17 depends on the desired relationship between the movement of the core assembly 15 and the resulting variation of the capacitances between the core assembly and the coatings 11, 12 and 13 or in other words on the desired dial calibrations indicating the frequency of the received waves.

An input transmission line 25 and an output transmission line 26 are provided for connecting the filter structure, for example, between the antenna of a UHF receiver and the mixer of the receiver or another tunable radio-frequency band pass circuit or amplifier. Transmission lines 25, 26 may be coaxial lines as shown. The input transmission line 25 comprises an outer conductor 27 and an inner conductor 28. The outer conductor 27 may be grounded as shown, while the coating 11 may also be grounded. The inner conductor 28 is connected to the coating 13. The transmission line 26 also comprises an outer conductor 30 which may be grounded as shown and an inner conductor 31 which is connected to the coating 12. Accordingly, a UHF input signal is impressed between coatings 13 and 11 and the UHF output signal is derived from coatings 12 and 11.

Figure 2:
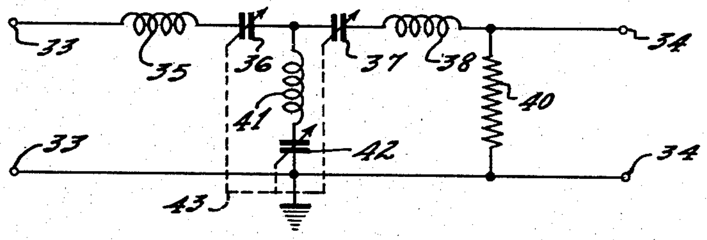
Figure 2 is an equivalent circuit diagram of the circuit structure of Figure 1.

It will be understood that the inner conductors 28 and 31 of the transmission lines 25 and 25 represent inductances, while the connecting rod 18 also represents an inductance. An equivalent circuit of the filter structure of Figure 1 is illustrated in Figure 2 wherein the input terminals are indicated at 33 and the output terminals at 34. The inductance of inner conductor 28 of the input transmission line 25 is shown at 35. Variable capacitor 36 corresponds to the capacitance between coating 13 and core portion 17, while the variable capacitance 37 indicates the capacitance between core portion 17 and coating 12. Inductor 38 indicates the inductance of the inner conductor 31 of the output transmission line 26. Resistor 40 indicates the output load resistance. Another series resonant circuit including inductor 41 and variable capacitor 42 represents the inductance of connecting rod 18 and the capacitance between core portions 16 and coating 11.

The electrical filter illustrated in Figure 2 accordingly is a T-formation filter consisting of two series resonant circuits 35, 36 and 37, 38 connected in series and a series resonant circuit 41, 42 which forms the shunt arm of the T-formation. Only the three capacitors 36, 37 and 42 are variable in unison as indicated by the dotted line 43. The inductances 35, 38 and 41 are constant as is the output load resistance 40.

A mathematical analysis of such a T-formation filter indicates very high attenuation at zero frequency, at infinite frequency and at a frequency where inductor 41 and capacitor 42 are in series resonance. The resulting filter network has a band pass characteristic and provides a high attenuation at a predetermined frequency. Depending upon the frequency at which the series resonant circuit 41, 42 is made to resonate, high attenuation may be provided at a frequency either below or above that of the pass band.

Figure 3:
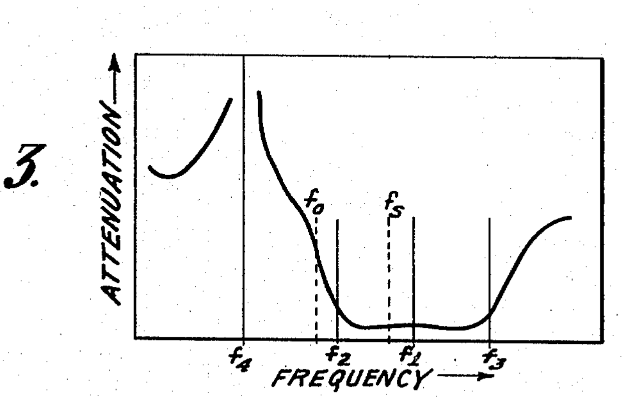
Figures 3 and 4 are graphs showing curves illustrating the attenuation of the structure of Figure 1 as a function of frequency.
Figure 4:
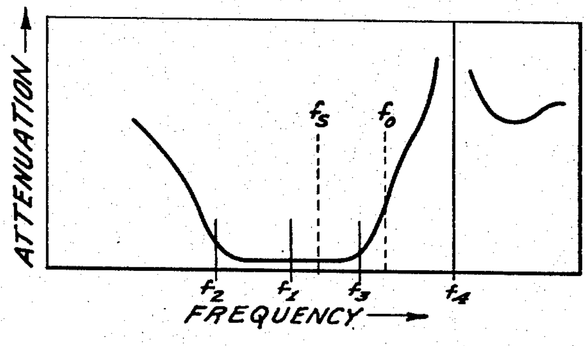

This has been illustrated in Figures 3 and 4 where the attenuation of the filter network is plotted as a function of frequency. In Figure 3 the high attenuation is provided below the frequency of the pass band, while in Figure 4 the high attenuation is at a frequency above that of the pass band. The symbols $f_1$, $f_2$ and $f_3$ indicate respectively in Figures 3 and 4 the center of the pass band and its lower and upper cut-off frequency, while $f_4$ indicates the frequency where high attenuation is provided.

For use in a superheterodyne receiver, the high attenuation at the frequency $f_4$ may be utilized for attenuating or rejecting the image frequency. Thus, the signal frequency $f_s$ may be made to coincide with the dotted line shown in Figure 3, and the oscillator frequency $f_0$ is also indicated in Figure 3. It will be seen that a certain amount of attenuation is obtained at the frequency of the local oscillator which will minimize oscillator radiation. The attenuation for the image frequency may be as high as 40 db.

The conditions indicated by the curve of Figure 3 are used when the oscillator frequency $f_0$ is below the signal frequency $f_s$. If the oscillator frequency $f_0$ is above the signal frequency $f_s$, the curve of Figure 4 may be used. The pass band from $f_2$ to $f_3$ should be sufficiently wide and may be as wide as twice the intermediate frequency to facilitate tracking. It will, of course, be understood that the width of the pass band between $f_2$ and $f_3$ and the relative position of the frequency $f_4$ at which high attenuation is obtained is a matter of design. However, it has been found experimentally and it can also be shown mathematically that the frequency difference between $f_1$ and $f_4$, that is, between the center of the pass band and the high attenuation frequency will remain constant throughout the tuning range of the filter structure of Figure 1.

The filter structure of Figure 1 is particularly suitable for lower frequencies. At higher frequencies, that is, frequencies of the order of 500 mc. to 890 mc., the capacitance existing between the coatings 12 and 13 may have such a small reactance that connecting rod 18 and the capacitance between core portion 16 and coating 11 are effectively shunted.

Figure 5:
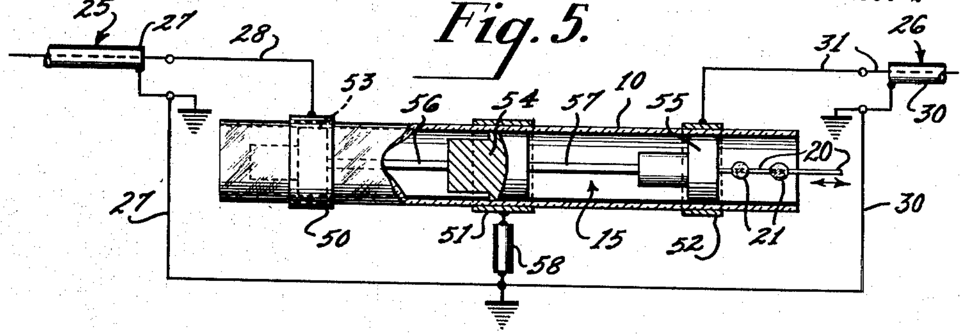
Figure 5 is a schematic view, with portions broken away and partly in cross-section of a preferred circuit structure in accordance with the invention.

Accordingly, the preferred embodiment of the invention suitable as a filter structure throughout the UHF television band has been shown in Figure 5 to which reference is now made. The filter structure of Figure 5 again comprises a tube 10 of a material having a high dielectric constant. Tube 10 is provided with three metallic coatings 50, 51 and 52 which are provided on the outside of tube 10 and spaced from each other. Each of the coatings 50 to 52 extends substantially about the entire circumference of the tube and substantially equal distances may be provided between coatings 50, 51 and 51, 52.

The core assembly 15 is provided with three core portions 53, 54 and 55 which cooperate individually with the three coatings 50, 51 and 52. Each core portion 53 to 55 provides an individual capacitance with its associated coating 50 to 52 and the core portions are again shaped to vary these capacitances upon movement of the core assembly. The particular shape of the core portions 53 to 55 depends on the desired relationship between the movement of the core assembly 15 and the resulting variation of the three capacitances. Connecting rods 56 and 57 connect the three core portions with each other. The core assembly 15 is actuated by wire 20 insulated from each other by glass beads 21.

An input transmission line 25 which may be a coaxial line as shown, has its inner conductor 28 connected to coating 53 while its outer conductor 27 is grounded as shown. The output transmission line 26 which may also be a coaxial line has its outer conductor 30 grounded while its inner conductor 31 is connected to coating 52. The coating 51 is grounded through rod or conductor 58 which represents an inductance.

Figure 6:
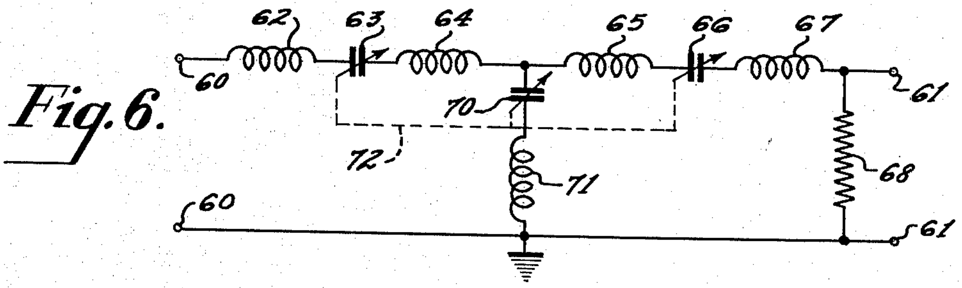
Figure 6 is an equivalent circuit diagram of the structure of Figure 5.

An equivalent circuit of the circuit structure of Figure 5 is shown in Figure 6. The filter network is again a T-formation filter and has a pair of input terminals 60 and a pair of output terminals 61. The common input and output terminal may be grounded as shown. The inductor 62 represents the inductance of the inner conductor 28 of the input transmission line 25. Capacitor 63 indicates the capacitance between coating 50 and core portion 53. The inductor 64 represents the inductance of connecting rod 56 while the inductor 65 represents the inductance of connecting rod 57. Capacitor 66 indicates the capacitance between core portion 55 and coating 52 while inductor 67 represents the inductance of the inner conductor 31 of output transmission line 26. The shunt resistor 68 shows the output load resistor. Finally, the capacitor 70 indicates the capacitance between core portion 54 and coating 51, while the inductor 71 represents the inductance of rod 58.

The T-formation filter network of Figure 6 again provides a pass band with a high attenuation portion adjacent the pass band. The high attenuation frequency is tracked with that of the pass band throughout the tuning range. The filter network has constant inductance and constant output load resistance and only the three capacitors 63, 66 and 70 are variable in unison as indicated at 72 by movement of the core assembly 15. The operation of the filter structure of Figure 5 is similar to that of Figure 1 and need not be described again here.

Figure 7:
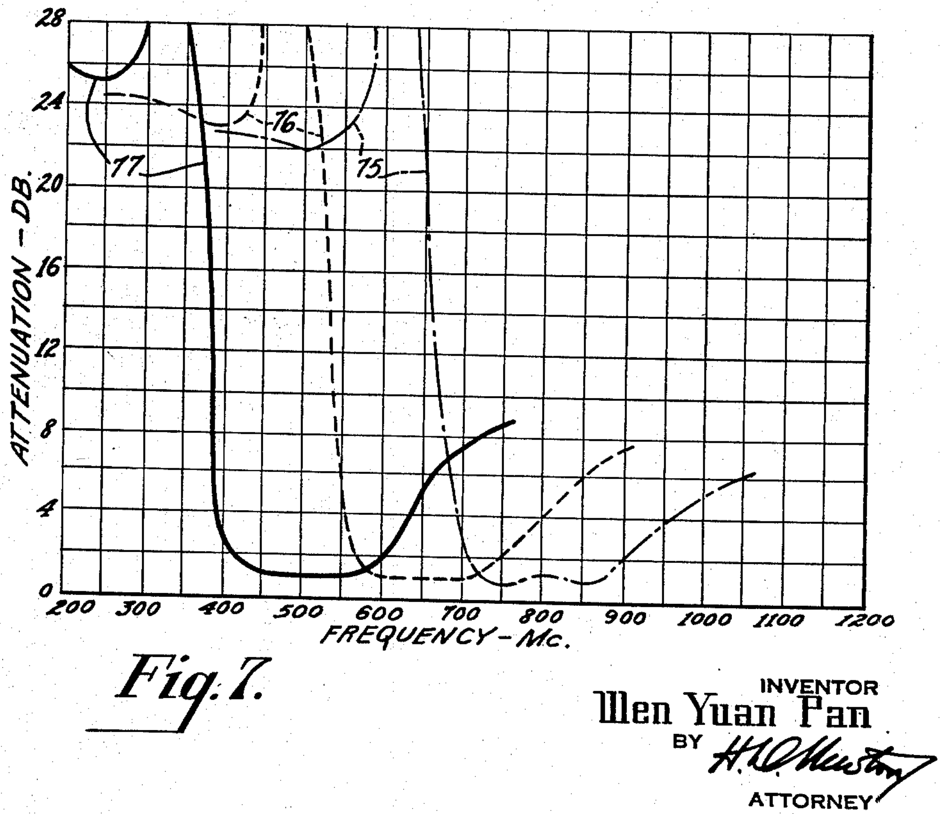
Figure 7 is a graph showing curves illustrating the attenuation of the structure of Figure 5 as a function of frequency for different positions of a movable tuning element thereof.

Figure 7 shows three curves 75, 76 and 77 which illustrate the attenuation obtained with the filter structure of Figure 5 as a function of frequency. The curves 75, 76 and 77 represent three different positions of the core assembly 15. The filter network preferably is designed in such a manner that its pass band equals two times the intermediate frequency as does the distance between the center of the pass band and the high attenuation frequency.

By way of example, the intermediate frequency may be 66 mc., the signal frequency 600 mc. and the oscillator frequency 534 mc. In that case, the image frequency is 468 mc., which will again produce a beat frequency of 66 mc. with the oscillator frequency of 534 mc. The curve 76 of Figure 7 shows the tuning position of the core assembly for this example. It will be seen that the attenuation for the oscillator frequency (534 mc.) as well as for the image frequency (468 mc.) is high.

The filter circuit of the invention also provides good attenuation for another spurious response, which is obtained when the second harmonic of the oscillator beats with an undesired signal to develop an intermediate frequency signal. Thus, if the oscillator frequency is, for example, 434 mc. in order to receive a signal having a frequency of 500 mc., the second harmonic of the oscillator is 868 mc., which would beat with an undesired signal of 802 (which is still in the UHF television range) to develop an undesired intermediate frequency wave of 66 mc. For such an undesired signal the filter circuit of the invention provides good attenuation.

The tube 10 may, for example, consist of a glass composition known as "Corning 0120" which has a dielectric constant of 6.6, a loss factor of .0106, a temperature coefficient of the dielectric constant of $+210\times10^{-6}$ per degree centigrade and a temperature coefficient of expansion of $8.9\times10^{-6}$ per degree centigrade. The tube 10 may be three inches long and may have an outside diameter of 0.250 inch and a wall diameter of 0.040 inch. The core portions 53 to 55 may consist of brass and the coatings 50 to 53 may be silver plated.

There has thus been disclosed a filter structure suitable in the UHF television band which provides a pass band having an insertion loss of the order of 1 db and a high attenuation adjacent the pass band which may amount to 40 db. The filter structure of the invention may be used in a superheterodyne receiver to provide a pass band for a desired radio-frequency signal within the UHF range and high attenuation for the image frequency and good attenuation for the oscillator frequency to reduce oscillator radiation. The filter network has a constant inductance and a constant load resistance and is tuned by variation of its capacitors. The high attenuation frequency maintains its constant difference from the center of the pass band throughout the tuning range. Mathematical analysis has shown that the T-formation filter of the invention or its equivalent $\pi$ formation is the only filter network which will provide tracking of the image frequency with the pass band of the filter.

What is claimed is:

1. A tunable filter structure for UHF signals comprising a first, a second and a third conductive capacitance member spaced in fixed relation to each other and electrically insulated from each other, a conductive tuning element adapted to move with respect to said members and electrically insulated therefrom, said element having at least two portions cooperating with said members and shaped to vary the capacitance between said members and said portions of the tuning element upon relative movement of said capacitance members, means providing a conductive connection between said portions having inductance, and a first, a second and a third conductor connected individually to said first, second and third members, whereby the capacitance provided between a predetermined one of said members and its associated portion of the tuning element and the inductance associated therewith provide high signal attenuation at a predetermined variable frequency.

2. A tunable filter structure for UHF signals comprising a first, a second and a third conductive capacitance member spaced in fixed relation to each other and electrically insulated from each other, a conductive core assembly adapted to move with respect to said members and electrically insulated therefrom, said core assembly having at least two portions cooperating with said members and shaped to vary the capacitance between said members and said core assembly upon relative movement thereof, means providing conductive connection between said core portions having inductance, a first, a second and a third conductor connected individually to said first, second and third members, and means for impressing a UHF input signal on said first and third conductor and for deriving a UHF output signal from said second and third conductor, whereby the capacitance provided between said third member and its associated core portion and the inductance associated therewith provide a high signal attenuation at a predetermined variable frequency.

3. A filter structure as defined in claim 2 wherein said first and second members are spaced relatively close, while said third member is spaced relatively far from said first and second members, wherein two core portions only are provided, one of said core portions cooperating with both said first and second members and the other one of said core portions cooperating with said third member, and wherein said inductance associated with said capacitance provided between said third member and the other one of said core portions is represented by said conductive connection.

4. A filter structure as defined in claim 2 wherein said members are spaced from each other by substantially equal distances, wherein said core assembly has three core portions, each cooperating with one of said members and wherein said inductance associated with the capacitance provided between said third member and its associated core portion is represented by said third conductor.

5. A tunable filter structure for UHF signals comprising a first, a second and a third conductive capacitance member spaced in fixed relation to each other and electrically insulated from each other, a conductive core assembly adapted to move with respect to said members and electrically insulated therefrom, said core assembly having at least two portions cooperating with said members and shaped to vary the capacitance between said members and said core assembly upon relative movement thereof, means providing a conductive connection between said core portions representing an inductance, a pair of transmission lines, each having two conductors, one conductor of each line being connected individually to said first and second members, the second conductor of each line being connected to said third member, said second conductor being connected to a point of substantially fixed potential, and means for impressing a UHF input signal on one of said lines and for deriving a UHF output signal from the other one of said lines, whereby the capacitance provided between said third member and its associated core portion and the inductance associated therewith provide a high signal attenuation at a predetermined variable frequency.

6. A tunable filter structure for UHF signal comprising a tube of a material having a high dielectric constant, a first, a second and a third metallic capacitance member provided on said tube in fixed spaced apart relationship, a core assembly slideable in said tube and having core portions cooperating with said members to provide individual capacitances between each of said members and its associated core portion, said core portions being shaped to vary said capacitances upon relative movement of said core assembly with respect to said members, said core portions being electrically interconnected by at least one conductor representing an inductance, three wires connected individually to said members and representing inductances, a first and a second one of said wires being adapted to be connected to a source of UHF signals, said second and a third one of said wires being adapted to be connected to a utilization means, said second wire being the common input and output terminal, whereby said filter structure provides a tunable pass band and high signal attenuation at a frequency adjacent to that of said pass band and variable with the frequency of said pass band.

7. A tunable filter structure for UHF signals comprising a tube of a material having a high dielectric constant, a first, a second and a third metallic coating provided on said tube in fixed spaced apart relationship, a core assembly slideable in said tube and having at least two core portions cooperating with said coatings to provide individual capacitances between each of said coatings and its associated core portion, said core portions being shaped to vary said capacitances upon relative movement of said core assembly with respect to said coatings, said core portions being electrically interconnected by at least one conductor representing an inductance, three wires connected individually to said members and having each inductance, one of said three wires being connected to a point of substantially fixed potential, a first and a second one of said wires being adapted to be connected to a source of UHF signals, said second and the third one of said wires being adapted to be connected to a utilization means, said second wire being the common input and output terminal, whereby said filter structure provides a tunable pass band and high signal attenuation at a frequency adjacent to that of said pass band and variable with the frequency of said pass band.

8. A T-formation filter structure for UHF signals consisting of three tunable series resonant circuits, said structure comprising a tube of a material having a high dielectric constant, a first and a second metallic capacitance member provided on the outside of said tube and disposed substantially opposite to each other and insulated from each other, a third metallic member provided on the outside of said tube and spaced from said first and second member and extending substantially about the entire circumference of said tube, a core assembly slideable in said tube and including a first core portion cooperating with both said first and second member and a second core portion cooperating with said third member, said core portions providing individual capacitances with their associated coatings and being shaped to vary said capacitances upon movement of said core assembly, a conducting rod connecting said core portions and representing an inductance, and three conductors connected respectively to said first, said second and said third member, said conductors providing inductances, whereby the resulting T-formation is tunable over a predetermined frequency range to provide a tunable pass band and high signal attenuation at a frequency tunable with that of said pass band and having substantially the same frequency difference from said pass band throughout the entire tuning range.

9. A T-formation filter structure for UHF signals consisting of three tunable series resonant circuits, said structure comprising a tube of a material having a high dielectric constant, a first and a second metallic coating provided on the outside of said tube and disposed substantially opposite to each other with respect to the axis of said tube and insulated from each other, a third metallic coating provided on the outside of said tube and spaced from said first and second coating and extending substantially about the entire circumference of said tube, a core assembly slideable in said tube and including a first core portion cooperating with both said first and second coating and a second core portion cooperating with said third coating, said core portions providing individual capacitances with their associated coatings and being shaped to vary said capacitances upon movement of said core assembly, a conducting rod connecting said core portions and representing an inductance, a first transmission line connected to said first and third coating, and a second transmission line connected to said second and third coating, the transmission line conductors connected to said third coating being connected to a point of substantially fixed potential, said transmission lines providing inductances, whereby the resulting T-formation filter is tunable over a predetermined frequency range to provide a tunable pass band and high signal attenuation at a frequency tunable with that of said pass band and having substantially the same frequency difference from said pass band throughout the entire tuning range.

10. A T-formation filter structure for UHF signals consisting of three tunable series resonant circuits, said structure comprising a tube of a material having a high dielectric constant, a first, a second and a third metallic capacitance member provided on the outside of said tube and spaced from each other, each of said members extending substantially about the entire circumference of said tube, a core assembly slideable in said tube and including three core portions cooperating individually with said members, said core portions providing individual capacitances with their associated members and being shaped to vary said capacitances upon movement of said core assembly, two conducting rods connecting said three core portions and representing each an inductance, said third member being provided intermediate said first and second members, three conductors connected individually to said first, said second and said third member, said conductors providing inductances, whereby the resulting T-formation is tunable over a predetermined frequency range to provide a tunable pass band and high signal attenuation at a frequency tunable with that of said pass band and having substantially the same frequency difference from said pass band throughout the entire tuning range.

11. A T-formation filter structure for UHF signals consisting of three tunable series resonant circuits, said structure comprising a tube of a material having a high dielectric constant, a first, a second and a third metallic coating provided on the outside of said tube and spaced from each other, each of said coatings extending substantially about the entire circumference of said tube, a core assembly slideable in said tube and including three core portions cooperating individually with said coatings, said core portions providing individual capacitances with their associated coatings and being shaped to vary said capacitances upon movement of said core assembly, two conducting rods connecting said three core portions and representing each inductance, said third coating being provided intermediate said first and second coatings, a first transmission line connected to said first and third coating, a second transmission line connected to said second and third coating, said transmission lines providing inductances, whereby the resulting T-formation is tunable over a predetermined frequency range to provide a tunable pass band and high signal attenuation at a frequency tunable with that of said pass band and having substantially the same frequency difference from said pass band throughout the entire tuning range.

References Cited in the file of this patent

UNITED STATES PATENTS

| Number | Name | Date |
|---|---|---|
| 1,559,638 | Martin | Nov. 31, 1925 |
| 2,014,422 | Carter | Sept. 17, 1935 |
| 2,190,430 | Krambeer | Feb. 13, 1940 |
| 2,527,608 | Willoughby | Oct. 31, 1950 |

FOREIGN PATENTS

| Number | Country | Date |
|---|---|---|
| 609,231 | Great Britain | Sept. 28, 1948 |